United States Patent [19]

Sugiura

[11] Patent Number: 4,561,771
[45] Date of Patent: Dec. 31, 1985

[54] SYSTEM FOR CONTROLLING THE RECIPROCATION OF A SCANNING APPARATUS

[75] Inventor: Masamichi Sugiura, Toyokawa, Japan

[73] Assignee: Minolta Camera Kabushiki Kaisha, Osaka, Japan

[21] Appl. No.: 521,624

[22] Filed: Aug. 9, 1983

[30] Foreign Application Priority Data

Aug. 10, 1982 [JP] Japan .................................. 57-139323

[51] Int. Cl.$^4$ .............................................. G03G 15/00
[52] U.S. Cl. .................. 355/14 R; 355/3 R; 355/14 C; 355/8; 318/626; 318/468
[58] Field of Search ............... 318/612, 613, 614, 561, 318/626, 480, 603, 640, 282, 467, 468; 355/8, 14 R, 14 C, 14 TR

[56] References Cited

U.S. PATENT DOCUMENTS

| | | | |
|---|---|---|---|
| 3,409,814 | 11/1968 | Azuma et al. | 318/341 |
| 3,471,103 | 10/1969 | Gabor | 318/293 X |
| 3,733,124 | 5/1973 | Tanaka et al. | 355/8 X |
| 3,824,440 | 7/1974 | McIntosh | 318/696 |
| 3,834,805 | 9/1974 | Griffin, Jr. | 355/8 |
| 4,126,389 | 11/1978 | Ikeda et al. | 355/8 X |
| 4,183,656 | 1/1980 | Ishihara et al. | 355/8 |
| 4,217,052 | 8/1980 | Tani et al. | 355/8 |
| 4,280,763 | 7/1981 | Arai et al. | 355/14 R |
| 4,287,461 | 9/1981 | Promis et al. | 355/8 X |
| 4,319,170 | 3/1982 | Brent | 318/258 X |
| 4,330,196 | 5/1982 | Yamaguchi | 355/8 |
| 4,332,461 | 6/1982 | Cail et al. | 355/14 R |
| 4,340,848 | 7/1982 | Hanagata et al. | 318/561 |
| 4,344,696 | 8/1982 | Murata et al. | 355/8 |
| 4,358,724 | 11/1982 | Haner | 318/681 |
| 4,371,254 | 2/1983 | Beery | 355/8 |
| 4,391,506 | 7/1983 | Koide | 355/8 |
| 4,423,366 | 12/1983 | Gottwald | 318/696 |
| 4,464,044 | 8/1984 | Matsuyama | 355/8 X |

FOREIGN PATENT DOCUMENTS

| | | |
|---|---|---|
| 45-14460 | 5/1970 | Japan . |
| 54-141134 | 11/1979 | Japan . |
| 55-113072 | 9/1980 | Japan . |
| 56-88144 | 7/1981 | Japan . |
| 56-83770 | 9/1981 | Japan . |
| 57-90666 | 6/1982 | Japan . |

*Primary Examiner*—William M. Shoop, Jr.
*Assistant Examiner*—Shik Luen Paul Ip
*Attorney, Agent, or Firm*—Price, Gess & Ubell

[57] ABSTRACT

A system for controlling the reciprocation of a scanning apparatus which includes a scanning device for scanning an original from a home position across the original to a scanned position and returning it from the scanned position back to the home position, a D.C. motor for driving the scanning device, and a switching circuit for providing electric power to the D.C. motor. The system further includes a home switch for detecting when the scanning device is in the home position, a counter for counting a distance of movement of the scanning device, and a speed detector for detecting the speed of the scanning device. A control device is coupled to the switching circuit for controlling the movement of the scanning device such that during the return of the scanning apparatus, a braking action is initiated when the scanning device returns to a preselected position, and the braking lasts until the returning speed is reduced to a predetermined low speed as detected by the speed detecting device. Then, the scanning device is returned at the low constant speed until a home position detecting device detects that the scanning device is in the home position. The counter device counts the distance of movement of the scanning device at the low constant speed, and the counted distance is used for calculating a preselected position for the next cycle of scan so that the distance in the next cycle of scan is controlled to be substantially equal to a predetermined distance.

18 Claims, 16 Drawing Figures

SYSTEM FOR CONTROLLING THE RECIPROCATION OF A SCANNING APPARATUS

BACKGROUND OF THE INVENTION

1 Field of the Invention

The present invention relates to an image transmitting device for use in an electrophotographic copying machine, image reading machine, or the like and, more particularly, it relates to a control system for controlling the reciprocation of a scanning apparatus, wherein the scanning apparatus scans an original document in a programmed manner so as to sequentially transmit images of the original document in slits onto a photoreceptor surface.

2 Description of the Prior Art

Generally, an electrophotographic copying machine or an image reading machine has a platen or a support for holding an original document, and a scanning apparatus for scanning across the original document in slits. The scanning apparatus includes a source of light producing a light beams in the form of a ribbon that impinges on the original document and an image transmitting device for transmitting the image, i.e., the reflected light beam from the original document to the photoreceptor surface. The image transmitting device is defined by a pair of mirror devices, or a movable lens device (such as disclosed in U.S. Pat. No. 3584950 to Gundlach), and a driving device for driving such a transmitting device. When the transmitting device is defined by two mirror devices, the driving device moves the mirror devices at predetermined different speeds. For example, the two mirror devices move at speeds having a ratio of 2 to 1, thereby effecting a complete scan of the original document and, thereafter, returning the scanning apparatus back to its initial position.

According to the prior art, the scanning apparatus is coupled to a main motor through a suitable clutch device which may take one of three different positions: a neutral position; a forward transmitting position; and a reverse transmitting position. When the clutch device is in the neutral position, no driving force is transmitted to the scanning apparatus.

When the clutch device is in the forward transmitting position, the scanning apparatus is moved at a constant speed for effecting a scanning operation. More specifically, when the clutch device is shifted from the neutral position to the forward transmitting position, the scanning apparatus starts to move from its initial or home position, and its speed is accelerated until it reaches a predetermined constant speed. The acceleration of the scanning apparatus is carried out along a predetermined distance, hereinafter referred to as a pre-running distance. During the acceleration, the speed of the scanning apparatus is not constant, thus it is not suitable to carry out the image transmission during this period. When the scanning apparatus moves past the pre-running distance, it is moved at a constant speed for carrying out the image transmission from the original document to the receiving surface.

When the scanning arrangement completes one scan, the clutch device is shifted to the reverse transmitting position, thereby returning the scanning arrangement back to its initial position as quickly as possible for the next scanning operation.

In recent years many approaches have been made to improve the copying machine, such as to speed up the copying operation, to make the copy as precise as the original, and to reduce the size and complexity of the copying machine. To accomplish such approaches, it is necessary to provide an improved scanning apparatus that can scan quickly with high stability and high precision, and that returns back to the initial position with little deviation. Furthermore, it is desirable to make the pre-running distance as short as possible.

To speed up the copying operation, the returning speed is made much faster than the scanning speed. But, when this is done, it is necessary to give a braking effect in a highly controlled manner, otherwise, the scanning apparatus stops at a position greatly different from its home position. If the scanning apparatus fails to return precisely to its initial position, it is necessary to provide means for setting the scanning apparatus to the home position, or to provide a wide home position so that the scanning apparatus has a pre-running distance sufficiently long to accelerate the scanning apparatus to the required speed even when the scanning apparatus is stopped at a position greatly displaced towards the scanning area. The employment of the setting means or the long pre-running distance results in an increase in the number of parts or the size of the copying machine. Furthermore, it fails to speed up the copying operation.

To overcome the above disadvantages, various improved systems have been proposed, such as employing a servo-control system having a pulse motor or a D.C. motor. Such improvements are disclosed in, for example: U.S. Pat. No. 4,332,461 to Cail et al.; U.S. Pat. No. 4,287,461 to Promis et al.; and U.S. Pat. No. 4,371,254 to Beery.

In the proposed systems, however, a memory means is provided which stores information of proper speed and position of the scanning apparatus throughout the operation, and a servo-control that controls the actual speed and position to be the same as those stored in the memory means. The system according to Beery has a control means that controls only the return movement of the scanning arrangement, wherein the speed and position are controlled by the use of an optical grating.

The prior art systems are disadvantages in that a memory means having a large capacity must be used, and the design is complex.

In order to accomplish the return of scanning arrangement back to the home position with a simple structure, an improved control system for the scanning arrangement is disclosed in U.S. Pat. application Ser. No. 511,390, filed July 5, 1983, which is assigned to the same assignee as the present application. According to this U.S. Pat. application, a brake switch is provided in the path of the scanning apparatus so that during the return mode of the scanning apparatus, the scanning apparatus is first moved with full power when the apparatus hits the brake switch, it is braked to slow down to a certain low speed. Thereafter, the scanning apparatus is moved in the constant slow speed until it is returned back to the home position. In this manner, regardless of the scanned speed or distance, the scanning apparatus can be returned exactly back to the home position without constantly making a comparison between the preferred return pattern and the actual return pattern. Therefore, it is not necessary to provide a memory means having a large capacity. Thus, the control of the scanning apparatus can be accomplished with a simple structure.

However, according to this system, the distance for the scanning apparatus to return under the low constant speed becomes long, as the scan distance decreases, resulting in long period of time to complete one scan-and-return movement. The return distance under the low constant speed can be reduced by adding a timer which starts counting a preselected time in response to the actuation of the brake switch. When it counts the preselected time, the scanning apparatus starts braking. However, because the timer has some tolerance, and because of the deterioration with age of the timer and its associated parts, or variations with environmental changes, it is almost impossible to make the low speed return distance very short.

SUMMARY OF THE INVENTION

The present invention has been developed with a view to substantially solve the above described disadvantages and has for its essential object to provide an improved system for controlling the reciprocation of a scanning apparatus wherein each cycle of scan and return operation is carried out in a short priod of time with high stability.

It is also another object of the present invention to provide a system for controlling the reciprocation of a scanning apparatus which has a simple design and a simple control system.

In accomplishing these and other objects, a system for controlling the reciprocation of a scanning apparatus according to the present invention comprises a scanning device for scanning an original from a home position across the original to a scanned position and returning it from the scanned position back to the home position, a D.C. motor for driving the scanning device, and a switching circuit for providing electric power to the D.C. motor. The system further comprises a home position detecting means for detecting when the scanning means is in the home position, an intermediate position detecting means for detecting when the scanning means moves past a predetermined intermediate position, a counter means for counting a distance of movement of the scanning means, and a speed detecting means for detecting the speed of the scanning means. A control means is coupled to the switching circuit for controlling the movement of the scanning means such that: the scanning means scans across the original at a predetermined constant speed; when the scanning means reaches the scanned position, it starts to return back towards the home position by application of a constant supply of power at a predetermined level; when the scanning means is returned back to the predetermined intermediate position as detected by the intermediate position detecting means, the counter means starts to count the distance of movement of the scanning means; when the counter means counts a preselected distance TM the scanning means is braked until the returning speed is reduced to a predetermined low speed as detected by the speed detecting means; the scanning means is returned at a low constant speed until the home position detecting means detects that the scanning means is in the home position; the counter means counts the distance CT of movement of the scanning means at the low constant speed; the scanning means is stopped at the home position; and the distance CT is used for calculating a distance TM for the next cycle of scan, particularly for the return thereof, so that the distance CT in the next cycle of scan is controlled to be substantially equal to a predetermined distance.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 1b is a cross sectional view taken along a line Ib-Ib shown in FIG. 1a;

DESCRIPTION OF THE PREFERRED EMBODIMENT

Figure 1A:
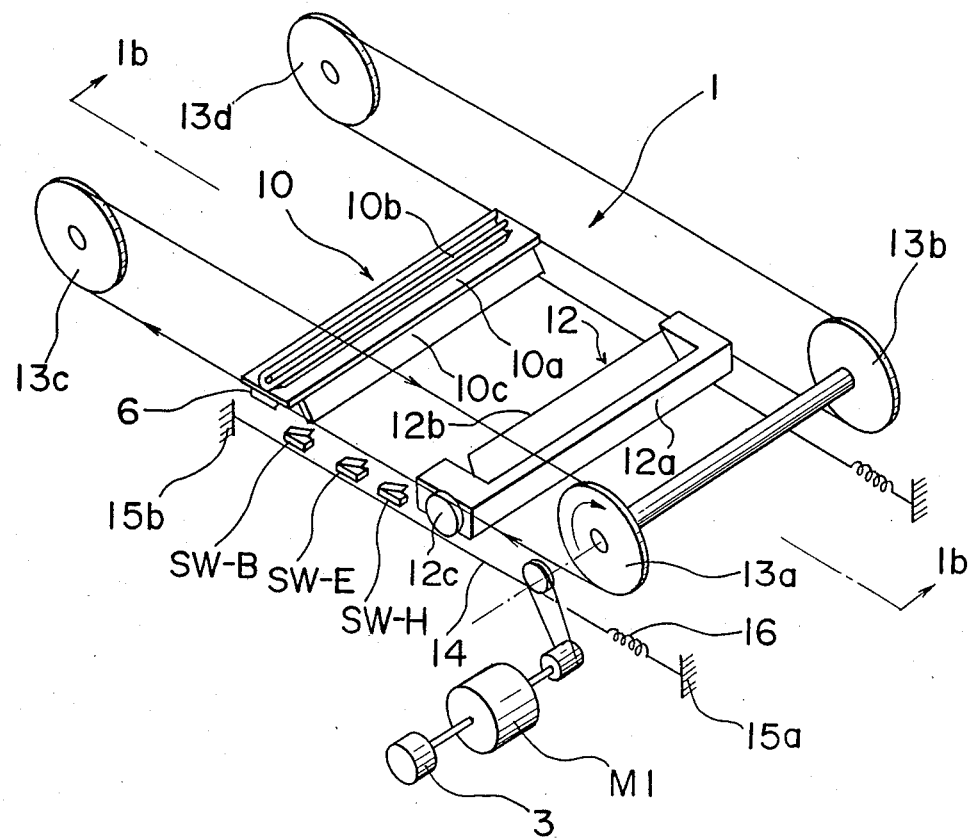
FIG. 1a is diagrammatic view of a scanning apparatus employed in an electrophotographic copying machine.
Figure 1B:
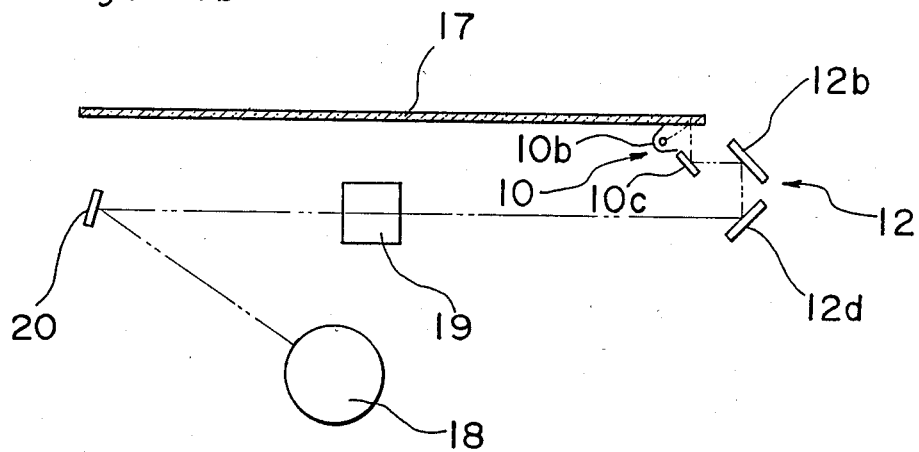

Referring to FIGS. 1a and 1b, a scanning apparatus 1 according to the preferred embodiment of the present invention is shown for use in a copying machine of a type capable of making copies of various sizes in various magnifications. The scanning apparatus 1 comprises a first carriage 10 and a second carriage 12. The first carriage 10 includes a carriage support 10a, on which a light source 10b is mounted on one side, and a first mirror 10c is mounted along the side thereof. The second carriage 12 includes a carriage support 12a, on which second and third mirrors 12b and 12d are mounted along the side thereof, and a pair of pulleys 12c mounted on the opposite ends. A ribbon of light emitted from the light source 10b reflects on an original document (not shown) on a platen 17 and further reflects on the first, second and third mirrors 10c, 12b and 12d, and is directed towards a photoreceptor surface 18 through a projection lens 19 and fixed mirror 20.

Scanning apparatus 1 further includes a D.C. motor M1 designed to rotate in two directions, an encoder 3 connected to D.C. motor M1 for producing a train of pulses having a frequency corresponding to the speed of D.C. motor M1. The rotating force of the motor M1 is transmitted, through a suitable transmission means, to a first pair of wheels 13a and 13b which are axially connected to each other and are journalled in a housing (not shown). The first pair of wheels 13a and 13b are located at one end of the scanning apparatus 1, and a second pair of wheels 13c and 13d are provided at the other end of the scanning apparatus.

A string 14 is connected to the housing at point 15a, and extends around pulley 12c and the wheel 13a. The string 14 further extends around wheel 13c and pulley 12c, and is connected to the housing at point 15b. To keep the string 14 taut, a suitable spring 16 is provided. Between wheel 13c and pulley 12c, the string 14 is fixedly connected to the carriage support 10a. As shown in FIG. 1a, another string is provided on the other side of scanning apparatus 1.

Switches SW-H, SW-E and SW-B are provided along the path of the first carriage 10 so that a cam 6 provided on the carriage support 10a actuates the switches SW-H, SW-E and SW-B during the movement of the first carriage 10 in a manner which will be described later. Switch SW-H, referred to as a home switch, is provided for detecting when the scanning apparatus 1 is moved to its home position. Switch SW-B, referred to as a brake switch, is provided to start braking the scanning apparatus 1 during the return movement of the scanning apparatus 1. Switch SW-E, referred to as an exposure switch, is provided for generating a signal for starting the exposure and for controlling various operations described below. Each of the switches SW-H, SW-E and SW-B is a normally-open switch and, is turned on when actuated by cam 6.

When a wheels 13a and 13b rotate in the direction shown, string 14 moves in the direction shown at a speed f. Thus, first carriage 10 connected to the string 14 moves at the speed f. Because string 14 extends around pulley 12c, the second carriage 12 moves at speed f/2 in the same direction as first carriage 10. When the scanning apparatus is in the home position, first carriage 10 is shifted towards the first pair of wheels 13a and 13b such that cam 6 is positioned to actuate home switch SW-H.

From the home position, carriage 10 moves towards the second pair of wheels 13c and 13d to effect a scan movement of the scanning apparatus. During the scan movement, cam 6 of carriage 10 actuates exposure switch SW-E thereby exposing the original document. Thereafter, the scanning apparatus returns from adjacent wheels 13c and 13d back towards the home position. During the return of the scanning apparatus and when carriage 10 actuates braking switch SW-B, a brake timer starts to count a predetermined amount of time, and thereafter, a braking action is provided to carriage 10. Such braking action is continued until the scanning apparatus is returned very close to the home position, as will be described in detail later. When the scanning arrangement returns back to a position very close to the home position, it is further returned at a constant low speed Vret for a play distance and, thereafter, is gently returned to the home position with little deviation. According to the present invention, a microcomputer is provided for memorizing said play distance. When said play distance become rather long, the microcomputer so calculates as to prolong the amount of time which the brake timer has to count to make the play distance in a subsequent scan as short as possible, thereby shortening (in time) the entire copying operation.

The above described movement of first carriage 10 is accompanied by the movement of second carriage 12, but in half the speed of first carriage 10.

Figure 4:
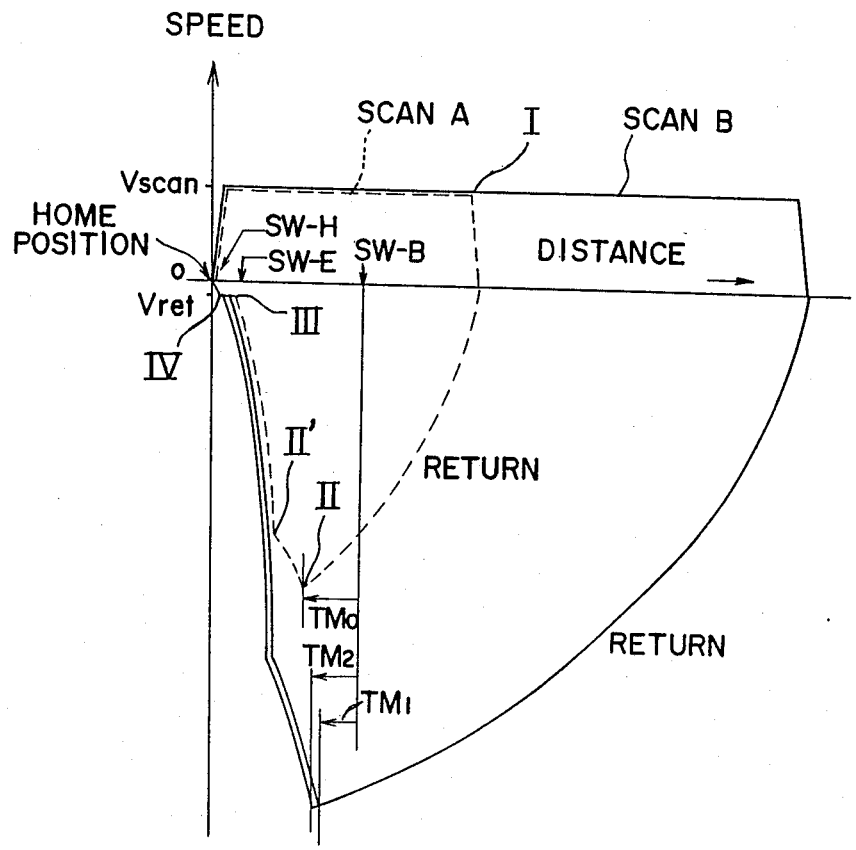
FIG. 4 is a graph showing a pattern of movement of a scanning apparatus according to the preferred embodiment of the present invention.

When particularly observing first carriage 10, the movement of the carriage 10 can be diagrammatically depicted as shown in the graph of FIG. 4, wherein abscissa and ordinate represent, respectively, position and speed. In the graph, the position 0 is home position. According to the present invention, the scanning apparatus carries out a test or provisional scan A and a normal scan B. Test scan A is carried out at the beginning of each succession of copies. As shown by the dotted line, the provisional scan A starts from the position 0 such that carriage 10 is accelerated up to a speed Vscan by an electric power being constantly applied to motor M1, within the pre-running. Thereafter, the carriage is moved at the constant speed Vscan with electric power being intermittently applied to motor M1. Then, at a point I, carriage 10 is forced to return back by a constant power supplied to the motor M1 which causes the motor to turn in the reverse direction. The returning force is maintained constant until at point II, that is, until the brake timer completes counting a predetermine amount of time, e.g., TMO. Thereafter, a braking action is applied to carriage 10 until its speed is reduced to Vret, i.e., until at point III. Then, carriage 10 continues to be returned at constant speed Vret until it is moved to a position IV very close to the home position. Thereafter, carriage 10 is again braked to return it exactly to the initial position, i.e., the home position. During the above described provisional scan, the microcomputer counts a time period between the points III and IV and stores the counted time for use in controlling the return movement for the subsequent normal scan B in such a manner as to make the time between points III and IV as short as possible. This is done by changing the magnitude of the time amount to be counted in the brake timer. When the provisional scan A is completed, a normal scan B is carried out repeatedly in a manner shown by the solid line in FIG. 4. Each time the normal scan B is carried out, the microcomputer counts and memorizes the time period between the points III and IV, and uses the counted time to change the amount of time to be counted by the brake timer in the return movement for the subsequent normal scan B. Accordingly, the return movement for the subsequent normal scan B is carried out with a shorter time between the points III and IV.

The above described movements of first carriage 10 is effected by D.C. motor M1, and the driving of motor M1 is controlled by a control system described in detail below.

Figure 2:
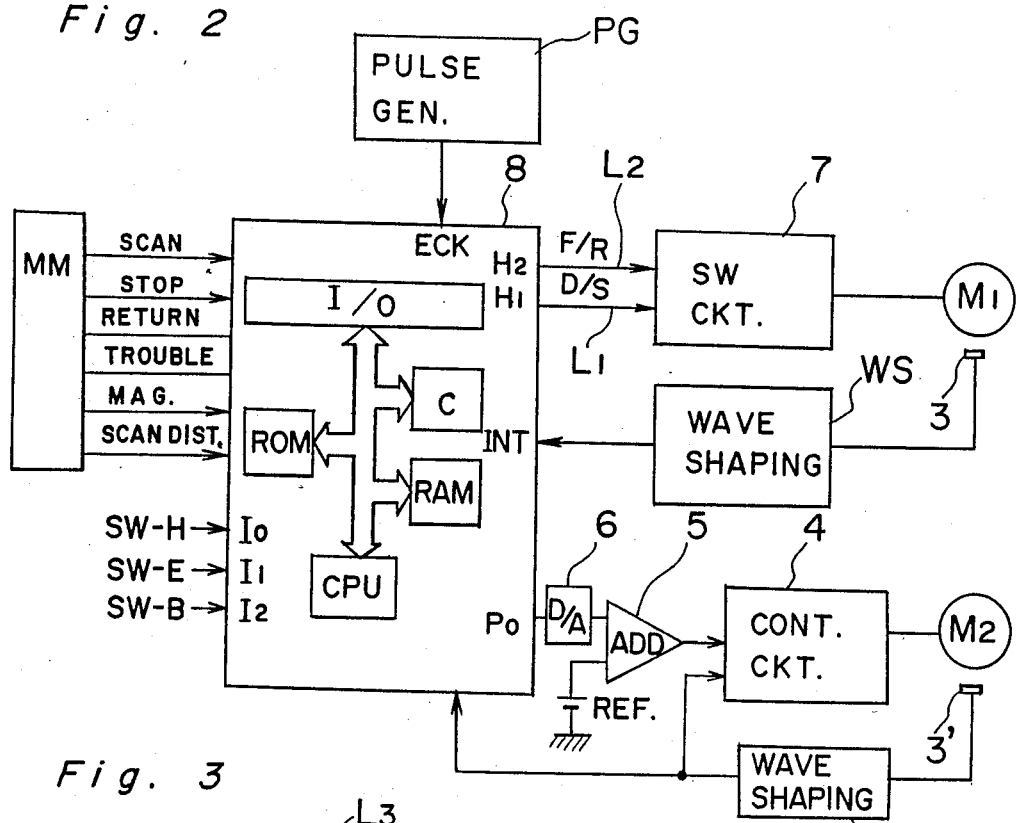
FIG. 2 is block diagram showing a control system for reciprocation of a scanning apparatus according to the present invention.

Referring to FIG. 2, a block diagram of a control system for controlling motor M1 comprises a master computer MM, a micro-computer 8, a pulse generator PG for generating a train of clock pulses having a frequency, e.g., 200 kHz, a wave shaping circuit WS for wave shaping the pulses obtained from encoder 3, and a switching circuit 7 for driving motor M1. The pulses produced by wave shaping circuit WS are applied to a terminal INT of microcomputer 8 by detecting rising or leading edges of the pulses microcomputer 8 starts to carry out an interrupt routine procedure, which will be described in detail later in connection with FIGS. 7 and 8. Switching circuit 7 is connected through lines L1 and L2 to terminals H1 and H2, respectively, of microcomputer 8. Terminal H2 produces signals HIGH or LOW representing a forward or reverse direction of rotation respectively, and the terminal H1 produces signals HIGH or LOW representing drive or non-drive mode. The combination of signals on lines L1 and L2 provides various modes, as will be described later.

According to the preferred embodiment, the control system further includes a control circuit 4 for controlling a motor M2, which is provided for driving a photoreceptor drum 18 (FIG. 1) and other associated parts (not shown). Like motor M1, the motor M2 is provided with an encoder 3' from which a train of pulses corresponding to the speed of motor M2 is produced. The train of pulses from encoder 3' is applied to a wave shaping circuit WS' and further to control circuit 4 and also to microcomputer 8. Microcomputer 8 uses the train of pulses from wave shaping circuit WS' to synchronize the scan of the scanning arrangement with the rotation of the photoreceptor drum. Also, the train of pulses from wave shaping circuit WS' is fed to a D/A (digital-to-analog) converter 6 and further to an adder 5. Thus, D/A converter 6 produces an analog signal having a level corresponding to the speed of motor M2, and adder 5 produces an analog signal which is the sum of the analog signal from D/A converter 6 and a predetermined reference level. The signal from adder 5 is applied to control circuit 4 for controlling motor M2 to the required speed.

It is to be noted that since the scanning apparatus is driven not only under a constant speed mode, but also under a full acceleration mode or under a brake mode, motor M1 is controlled by pulse-duration modulation (PDM) wherein the duty cycle of applied power, supplied in a form of pulses, is changed with respect to the required mode. Conversely, the photoreceptor drum is driven only in the constant speed mode and, therefore, motor M2 is controlled by the change of amplitude of the power applied thereto. Thus, switching circuit 7 is a type which controls the pulse-duration of the power supplied to the motor M1, and control circuit 4 is a type which controls the amplitude of the power supplied to motor M2.

Master computer MM is provided for controlling the various operations, such as paper feeding operation and image forming operation, etc., in a predetermined sequence to carry out the copying operation. Master computer MM, in a synchronized manner with such sequential operations, produces a scan signal for effecting scan A or B, and a stop signal for stopping the scan. It also produces a magnitude signal indicating an enlarging or reduction factor, and a scan distance signal indicating the size of the copy paper. Furthermore, master computer MM receives a return signal and a trouble signal from microcomputer 8. In addition, microcomputer 8 receives HIGH or LOW outputs from switches SW-H, SW-E and SW-B on inputs I0, I1 and I2, respectively.

Micro-computer 8 includes an input and output port I/O, a read-only-memory ROM, a central-processing-unit CPU, a random-access-memory RAM, and a counter C. In addition to the above-mentioned signals, micro-computer 8 further receives clock pulses from pulse generator PG, and a train of pulses representing the speed of the scanning apparatus from encoder 3 through wave shaping circuit WS. By using the clock pulses from the pulse generator PG, micro-computer 8 counts the time interval between two pulses from encoder 3, thereby detecting the speed of the scanning apparatus. Also, by using these and other signals, microcomputer 8 produces at its terminals H1 and H2 control signals which are provided through lines L1 and L2 to switching circuit 7 for controlling D.C. motor M1.

Figure 3:
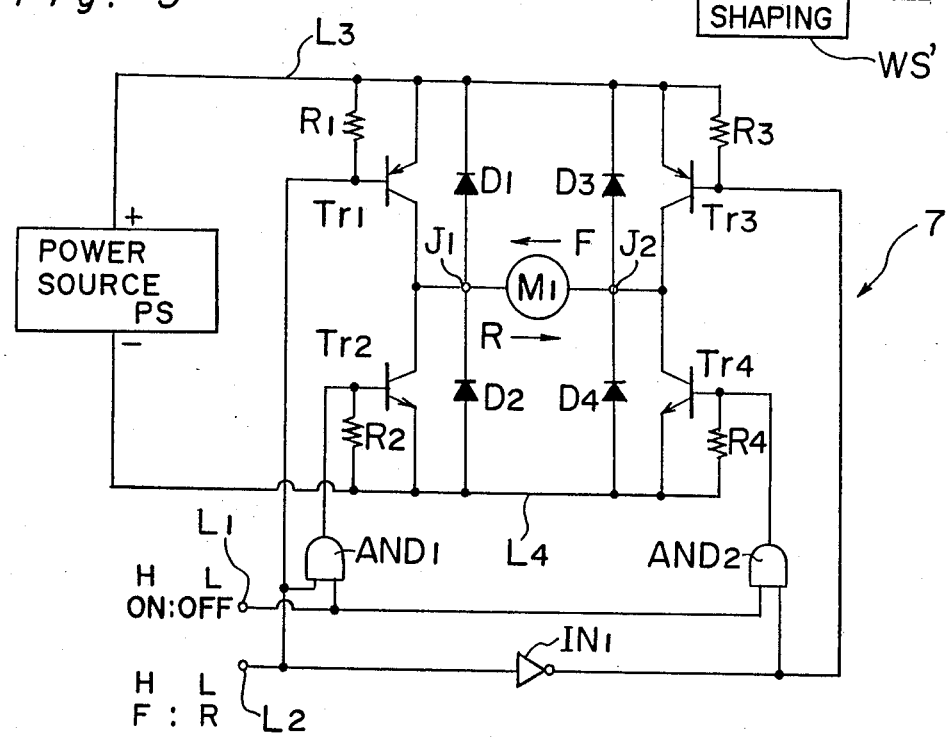
FIG. 3 is a circuit diagram of the switching circuit shown in FIG. 2.

Referring to FIG. 3, switching circuit 7 comprises a power source PS for supplying D.C. power on line L3 and L4. Power source PS is designed for providing power equal to or less than the maximum rated power of motor M1, thereby preventing motor M1 from being damaged even during the return movement of the scanning apparatus. Diodes D1 and D2 are connected across lines L3 and L4 in series the in reverse bias direction as are diodes D3 and D4. A junction J1 between diodes D1 and D2 is connected to one input of D.C. motor M1, with a junction J2 between diodes D3 and D4 being connected to the other input of D.C. motor M1. Transistors TR1 and TR3 are connected parallel to diodes D1 and D3, respectively, with resistors R1 and R3 being connected between the base thereof and line L3. Similarly, transistors TR2 and TR4 are connected in parallel with diodes D2 and D4, respectively, with resistors R2 and R4 being connected between the base thereof and line L4.

Line L1 from micro-computer 8 is connected to one input of an AND gate AND1 and also to one input of another AND gate AND2. Line L2 from micro-computer 8 is connected to the other input of the AND gate AND1, and also to base of the transistor Tr1. Line L2 is further connected through an inverter IN1 to the other input of the AND gate AND2 and also to the base of transistor Tr3. The output of the AND gate AND1 is connected to the base of transistor Tr2, and the output of AND gate AND2 is connected to the base of transistor Tr4.

It is to be noted that diodes D1, D2, D3 and D4 are provided to cut off the counter electromotive force produced during the forward driving of motor M1 or when the operating mode, which will be described below, is changed. Thus, transistors Tr1, Tr2, Tr3 and Tr4 one protected from abnormal voltages.

Depending on the combination of signals HIGH and LOW appearing on lines L1 and L2, switching circuit 7 shown in FIG. 3 takes on one of four different modes of operations, which are: a forward mode effected during movement of first carriage 10 between the points 0 and I shown in FIG. 4; a reverse drive mode effected during movement of first carriage 10 between the points I and II; a brake mode effected during movement of first carriage 10 between points II and III, and between points IV and 0; and a reverse mode effected during the movement of first carriage 10 between points III and IV.

The forward mode can be divided into a forward drive mode (FD) and a forward non-drive mode (FN). The forward drive mode (FD) is accomplished when both lines L1 and L2 carry signal HIGH. Accordingly, transistors Tr3 and Tr2 are turned to a conductive state, and transistors Tr1 and Tr4 are turned to a non-conductive state, thereby allowing current flow from the line L3 through transistor Tr3, motor M1 and transistor Tr2 to line L4. Thus, by virtue of the current flow in the direction indicated by an arrow F, motor M1 is driven constantly in the forward direction, thereby accelerating the scanning apparatus.

The forward non-drive mode (FN) is accomplished when line L2 carries signal HIGH, and line L1 carries signal LOW. In this mode, transistor Tr3 is turned on, and the rest of the transistors are turned off. Thus, the current flow F is interrupted, so that motor M1 forward only by inertia.

In the forward mode between points 0 and I, the forward drive mode (FD) takes place continuously to accelerate the scanning apparatus to the required speed Vscan. Thereafter, the forward drive mode (FD) and the forward non-drive mode (FN) take place alternately at a predetermined frequency depending on the required speed Vscan. In other words, after the acceleration to the required speed Vscan, line L2 carries signal HIGH and line L1 alternately carries signals HIGH and LOW to drive motor M1 intermittently in the forward direction, thereby moving the scanning apparatus forward at a constant speed Vscan.

The reverse drive mode (RD) is accomplished when line L2 carries signal LOW, and line L1 carries signal HIGH. In this mode, transistors Tr1 and Tr4 are turned to a conductive state and transistor Tr2 and Tr3 are turned to a non-conductive state, thereby allowing current flow from line L3 through transistor Tr1, motor M1 and transistor Tr4 to line L4. Thus by virtue of the current flow in the direction indicated by arrow R, motor M1 is driven constantly in the reverse direction, effecting a rapid return of the scanning apparatus.

The brake mode can be divided into a regenerative brake mode (FN) which takes place between points II and II', and a coercive brake mode (FD) which takes place between points II' and III. The regenerative brake mode (FN) is accomplished when line L2 carries signal HIGH, and line L1 carries signal LOW. The regenerative brake mode (FN) has the transistors conditioned in the same manner as in the forward non-drive mode (FN) and, therefore, both modes are indicated as (FN). Thus, in the regenerative brake mode (FN), only transistor Tr3 conducts and transistors Tr1, Tr2 and Tr4 are turned to the non-conductive state. Since the regenerative brake mode occurs while the scanning apparatus is moving in the return direction at a high speed, motor M1 operates as a generator producing regenerated current in direction F. The regenerated current flows through transistor Tr3, motor M1 and diode D1, and generates a counter electromotive force which creates a braking action.

The coercive brake mode (FD) is accomplished when both lines L1 and L2 carry signal HIGH so as to permit current flow in direction F. As understood from the above, the coercive brake mode has the transistors conditioned in the same manner as that in the forward drive mode (FD). But, since the coercive brake mode takes place while the scanning apparatus is moving in the return direction, the forward driving force serves as a coercive braking force.

The reverse mode is accomplished by alternately producing the reverse drive mode (RD), as mentioned above, and the reverse non-drive mode (RN). Under the reverse non-drive mode (RN), line L2 carries signal LOW and as does line L1. Thus, in the reverse mode, transistor Tr1 is maintained conductive, and transistors Tr2 and Tr3 are maintained non-conductive. Furthermore, transistor Tr4 is alternately turned conductive and non-conductive. Accordingly, a current intermittently flows through the motor M1 in direction R, thereby moving the scanning arrangement in the reverse direction at a constant speed Vret.

Next, a program loaded in micro-computer 8 for controlling the scanning apparatus is described in connection with the flow chart shown in FIGS. 6 to 15.

Figure 6:
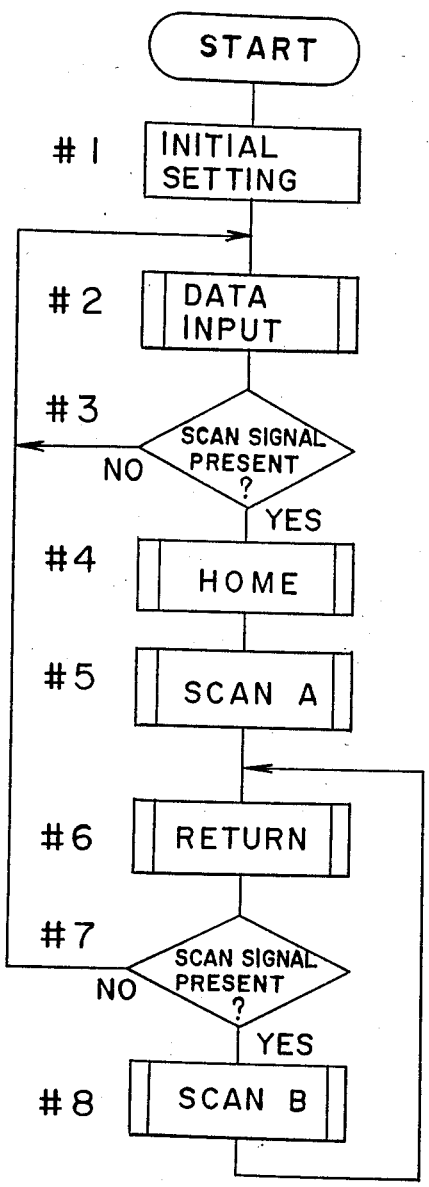
FIG. 6 is a flow chart of a main routine according to the preferred embodiment of the present invention.

Referring to FIG. 6 a main routine is shown. When a main switch (not shown) is turned on, the main routine starts, and in step #1, various parameters are set up in microcomputer 8 for the initial setting. Then, in step 190 2, various data, such as magnification and scan distance, are inputed. Such data may be renewed until the scan signal is present, as detected in the step #3. Then, in step 190 4, a subroutine HOME is carried out for properly positioning the scanning apparatus at the home position.

Thereafter, in step #5, a subroutine SCAN A is carried out for effecting the provisional scan, so as to obtain data for the subsequent normal scan B. It is to be noted that subroutine SCAN A, as well as subroutine SCAN B, control the movement of the scanning apparatus from the position 0 to the position I, while a subroutine RETURN, as effected in the next step #6, controls movement of the scanning apparatus from the position I back to the home position 0.

During subroutine RETURN, various data are gathered for use in the next subroutine RETURN. Then, in step #7, it is determined whether the scan signal is still present. If it is still present, the program goes to step #8 to carry out the subroutine SCAN B and repeats steps #6 #7 and #8. If the scan signal is not present, the procedure returns back to repeat the program from step #2.

Figure 5:
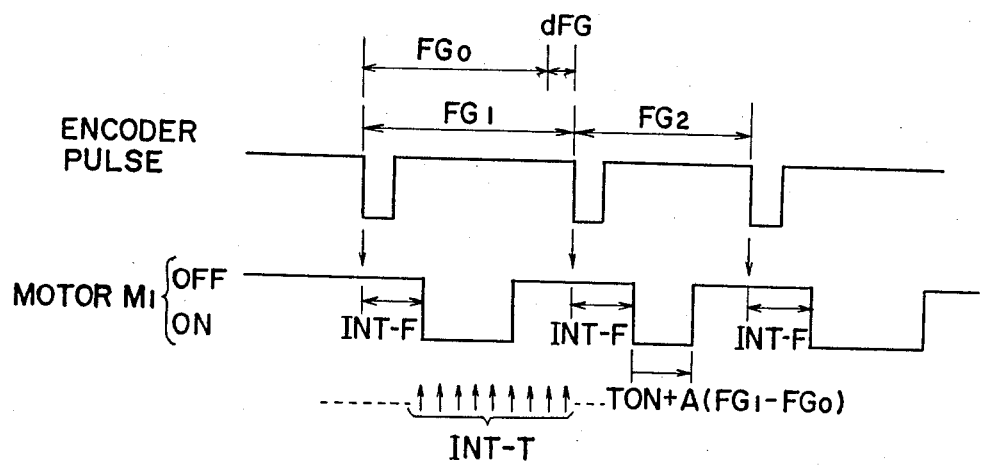
FIG. 5 is a graph showing waveforms of encoder pulses and power supplied to a motor M1 for driving the scanning apparatus.

Before describing each of the subroutines, the manner in which motor M1 is driven at a constant speed is described first. When motor M1 runs, encoder 3 produces a train of pulses as shown in FIG. 5, top row. While motor M1 is running, microcomputer 8 so controls the switching circuit 7 to provide power to the motor M1 for a predetermined period of time TON within each pulse spacing between consecutive encoder pulses. During time TON, switching circuit 7 is either in forward drive mode (FD) or reverse drive mode (RD), while during the remaining time, switching circuit 7 is either in forward non-drive mode (FN) or reverse non-drive mode (RN), thereby maintaining the required speed. The motor speed is being constantly examined by microcomputer 8 such that pulse spacings FG1, FG2, . . . between two consecutive encoder pulses are measured and, and each pulse spacing FGn is compared with a reference pulse spacing FG0. It is to be noted that the reference pulse spacing FG0 is a previously set time capable of running motor M1 at the required speed.

If the motor speed deviates from the required speed, it is corrected in the following manner. A counter in microcomputer 8 counts pulse spacing, such as FG1 shown in FIG. 5, and the counted pulse spacing FG1 is compared with a reference pulse spacing FG0 to obtain a difference dFG therebetween through a calculation:

$$dFG = FG1 - FG0.$$

When the detected pulse spacing FG1 is longer than the reference pulse spacing FG0, the scanning speed is slower than the required speed. When the detected pulse spacing FG1 is shorter than the reference pulse spacing FG0, the scanning speed is faster than the required speed. The difference dFG is multiplied by a constant A and, then, is added to a reference pulse duration TON, thus obtaining TON+A(FG1−FG0) immediately after the counting of the pulse period FG1. If the difference dFG is zero, it is understood that the motor speed is at the required speed. In FIG. 5, this calculation is carried out within a period indicated as INT-F. As shown in FIG. 5, bottom row, motor M1 is powered on, after period INT-F, for a calculated period of time TON+A(FG1−FG0). While motor M1 is controlled in this manner, the timer counts a pulse spacing FG2 for the control of a next power-on period. According to the preferred embodiment, the scanning apparatus is so controlled as to move at a constant speed Vscan or Vret, as understood from FIG. 4. Therefore, there are at least two different values stored for each of the parameters FG0, A and TON.

Figure 9:
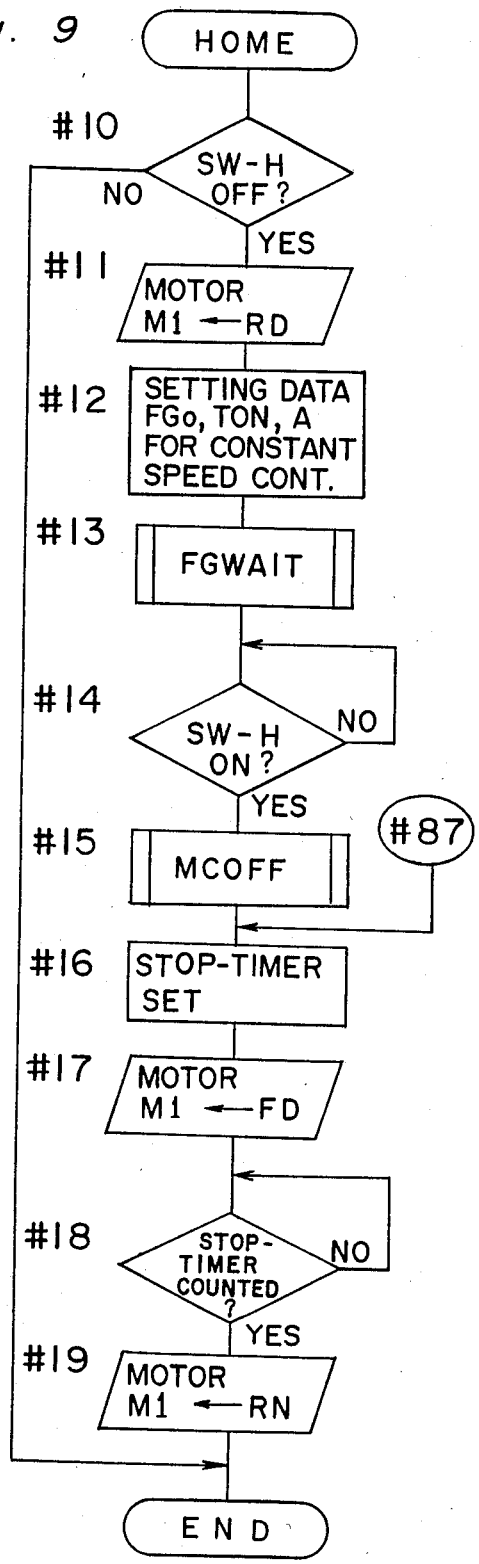
FIG. 9 shows a subroutine for moving the scanning apparatus to the home position.

Next, the subroutine HOME is described in detail. Referring to FIG. 9, it is determined whether home switch SW-H is off in step #10. If home switch SW-H is off, it is understood that the scanning arrangement is displaced towards the scanned position. In this case, switching circuit 7 is set in the reverse drive mode RD, in step #11, to start moving the scanning apparatus in the return direction at a speed based on the data set up in the next step #12. In step #12, data FG0, TON and A as stored in memory ROM and mentioned above are read out and shifted to registers in memory RAM. Then, in step #13, a subroutine FGWAIT is carried out for the start of the constant-speed control sequence described below.

Figure 10:
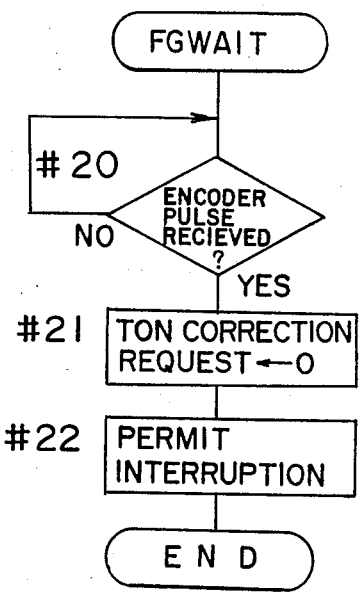
FIG. 10 shows a subroutine for permitting the interruption routine.

Referring to FIG. 10, the subroutine FGWAIT includes step #20 in which it is determined whether an encoder pulse is received. If an encoder pulse is received, the program advances to step #21 so as to set up a "0" indicating no request for the TON correction. Then, in step #22, interrupt routines INT-F and INT-T are permitted to be carried out when they are requested. Thereafter, subroutine FGWAIT ends.

Figure 8:
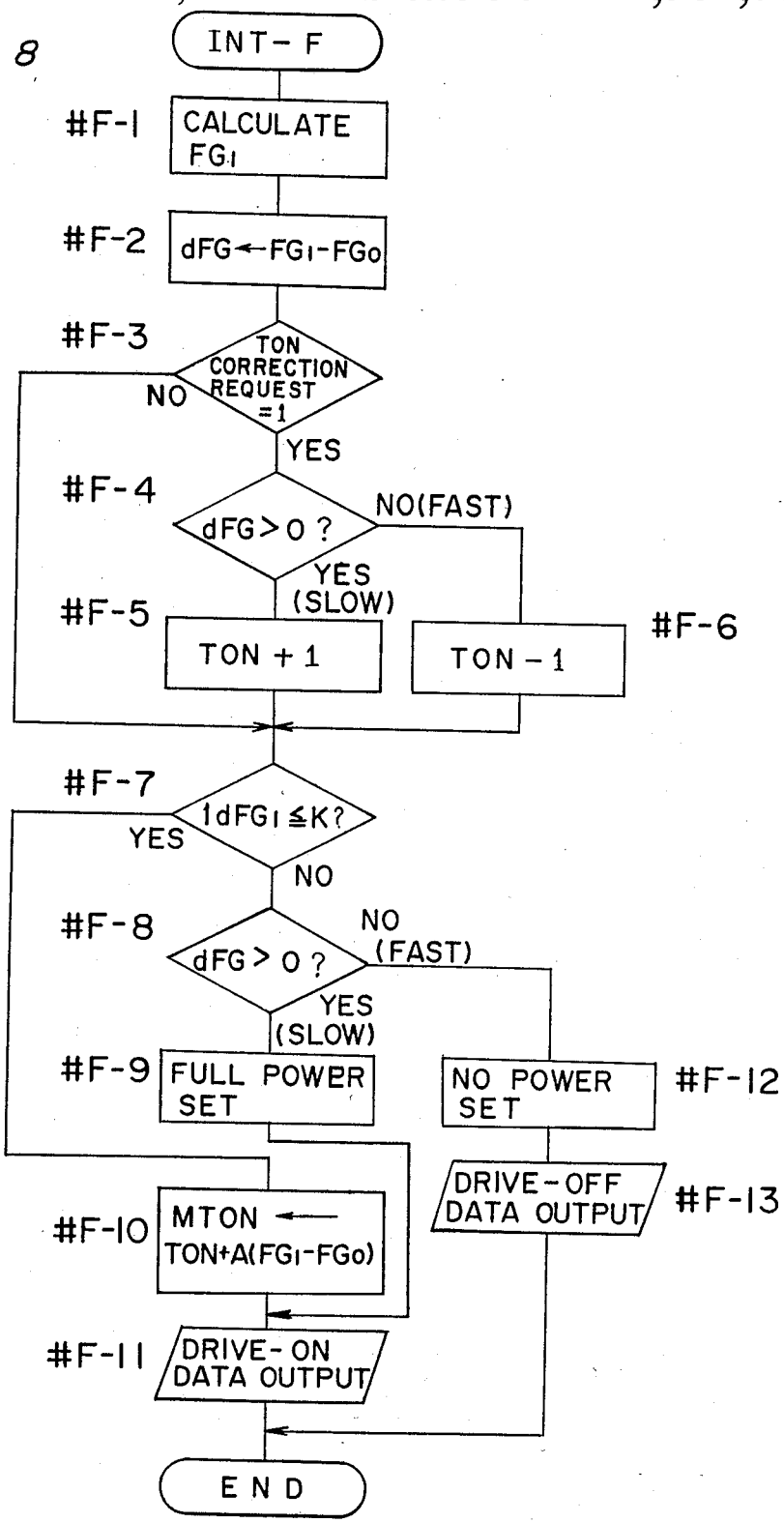
FIG. 8 shows an interruption routine for starting power supply to the motor M1 and calculating the amount of time to be counted in the counter shown in FIG. 7.

Referring to FIG. 8, a flow chart of interrupt routine INT-F is shown. Interrupt routine INT-F is carried out in response to each encoder pulse, as indicated in FIG. 5. In step #F-1, the pulse spacing, such as FG1 is calculated and, in the next step #F-2, the difference dFG=FG1−FG0 is calculated. Then, in step #F-3, it is determined whether there is a request for the TON correction. Since there is no such request as introduced in step #21, the program advances to step #F-7, wherein it is determined whether absolute of the difference dFG is within a tolerance K or not. If difference dFG is within tolerance K, the calculation TON+A(FG1−FG0) is carried out in step #F-10, and the calculated amount is stored in a register MTON. Then, at step #F-11, drive-on data is produced and, after that, the program returns back to subroutine HOME. As determined by the drive-on data, microcomputer 8 produces at its terminals H1 and H2 signals that sets switching circuit 7 in the reverse drive mode (RD).

Back to step #F-7, if the difference dFG is not within the tolerance K, it is further determined in step #F-8 whether difference dFG is positive or negative. If it is positive, meaning that the scanning speed is very slow, the program advances to step #F-9 for setting the full power, or maximum amount, in the register MTON, thereby constantly supplying electric power to the motor M1 without any interval. If the difference dFG is negative meaning that the scanning speed is very high, the program advances to step #F-12 for setting no power, or minimum amount, in register MTON, thereby supplying no electric power to motor M1. In this case, since the motor M1 remains de-energized, drive-off data is produced in step #F-13.

Figure 7:
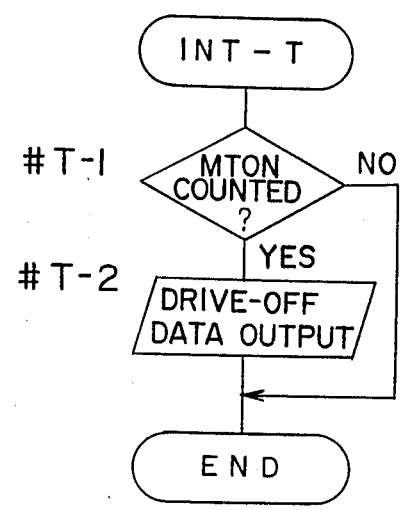
FIG. 7 shows an interruption routine for counting time for supplying power to the motor M1.

Referring to FIG. 7, a flow chart of interrupt routine INT-T is shown. Interrupt routine INT-T is carried out in response to the count-up of the counter provided in microcomputer 8. According to the preferred embodiment, the counter provided in microcomputer 8 is an 8-bit counter capable of counting $2^8=256$ clock pulses which is equal to 1.28 ms. Accordingly, the interrupt routine INT-T is repeated periodically with a time interval of 1.28 ms. Interrupt routine INT-T is carried out as follows. In step #T-1, it is determined whether the content of the register MTON is counted up to the required amount. If the content of register MTON is not counted up yet, or if the content of register MTON is initially minimum, e.g., zero, the interrupt routine INT-T ends, and thus, the program returns back to the subroutine HOME. If the content of register MTON is counted up to the required amount, the program advances to step #T-2 wherein drive-off data is produced, thereby the microcomputer 8 produces at terminals H1 and H2 signals that set switching circuit 7 temporarily in the return non-drive mode (RN).

According to subroutine HOME, since register MTON is stored with a calculated amount TON+A(FG1−FG0), interrupt routine INT-T (through steps "INT-T", "#T-1" and "END") is carried out the number of times necessary to count a time TON+A(FG1−FG0). During counting, motor M1 is driven under the reverse drive mode (RD). Thereafter, when time TON+A(FG1−FG0) is counted, the interrupt routine INT-T (through steps "INT-T", "#T-1", "#T-2" and "END") is carried out to produce the drive-off data. Thus, motor M1 continues to run by inertia under the reverse non-drive mode.

Thus, as indicated in FIG. 5, the interrupt routine INT-F is carried out in response to the encoder pulses, and during the interrupt routine INT-F, a time duration TON+A(FG1−FG0) is calculated. When the interrupt routine INT-F ends, motor M1 is powered for a period of time TON+A(FG1−FG0). Accordingly, motor M1 is powered intermittently to control the speed of the scanning apparatus.

Back to FIG. 9, after step 190 13, interrupt routine INT-F is repeated for a number of times, and also interrupt routine INT-T is repeated more intensively. Accordingly, the scanning apparatus is returned towards the home position at a constant speed Vret. When the scanning apparatus returns back to the home position, the home switch SW-H is turned on. Accordingly, the program advances from the step #14 to #15 for carrying out a subroutine MCOFF.

Figure 11:
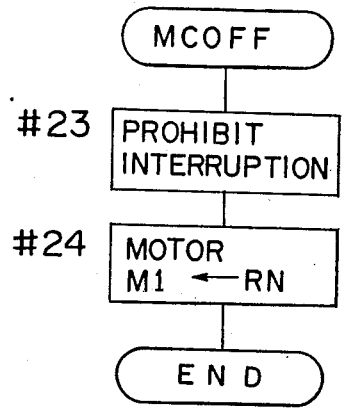
FIG. 11 shows a subroutine for prohibiting the interruption routine.

Referring to FIG. 11, subroutine MCOFF includes step #23 for prohibiting further interrupt routines, and step #24 for turning the switching circuit 7 to the reverse non-drive mode (RN). Therefore, it can be seen that a constant speed control is carried out between subroutines FGWAIT and MCOFF. After subroutine MCOFF, the program returns back to subroutine HOME. It is to be noted that motor M1 is still running in the reverse direction by inertia even after subroutine MCOFF.

Referring again to FIG. 9, at step 190 16, a stop-timer is actuated to count a predetermined time. Then, at step #17, switching circuit 7 is changed to the forward drive mode (FD). Since the motor M1 is now running in the reverse direction due to inertia motor M1 receives coercive braking force to stop rotation. When the stop-timer counts a predetermined time, the program advance from step #18 to #19, thereby turning switching circuit 7 to the reverse non-drive mode (RN). It is to be noted that the stop-counter counts a predetermined period of time necessary to stop the scanning apparatus from speed Vret.

Now, subroutine HOME ends with the scanning apparatus at the home position. Next, subroutine SCAN A for carrying out the provisional scan will be described.

Figure 12:
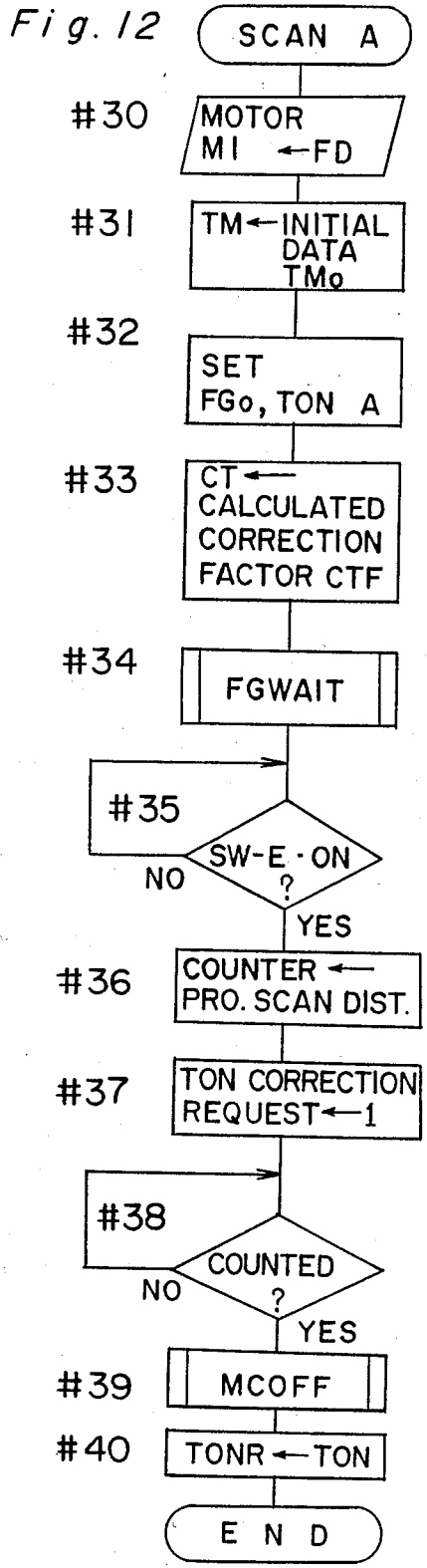
FIG. 12 shows a subroutine for carrying out a scan A.

Referring to FIG. 12, in step #30, switching circuit 7 is turned to the forward drive mode (FD). Thus, the scanning appartus starts to move forward from the home position. It is to be noted that the forward drive mode (FD) continues until at least the first encoder pulse occurs, so as to accelerate the scanning apparatus by applying a constant supply of power. Also, drive-on data necessary for the forward drive mode (FD), and drive-off data necessary for the forward non-drive mode (FN) are stored in memory RAM of microcomputer 8. Then, in step #31, a register TM is stored with an initial data, such as TM0, for use in a subsequent subroutine RETURN. Next, in step #32, data FG0, TON and A based on the required value are set in the respective registers for the constant speed control. Based on the scan distance to be carried out in the subsequent subroutine SCAN B as obtained in previous step #2, a correction factor CTF is calculated and stored in a register CT, in step #33. Correction factor CTF will be used for correcting the time which will be counted during subroutine RETURN of the provisional scan A. Such a correction will be necessary, because under the provisional scan A, the scan distance is much shorter than that of the normal scan B, and also because the time to start the braking action differs with respect to the scan distance.

Next, in step #34, subroutine FGWAIT is effected to permit interrupt routines INT-T and INT-F, so that the constant speed control starts after the first encoder pulse.

Then, in step #35, it is determined whether the exposure switch SW-E is on. When the exposure switch SW-E turns on, the program advances from step #35 to #36. In step #36, the counter is set with an amount of time for the provisional scan A, and in the step #37, a "1" indicating the request for the TON correction is set up.

It is to be noted that the counter mentioned in step #36 is a type which starts to count up in response to each encoder pulse, and is used not only for counting the time necessary for the provisional scan A but also counts time for normal scans B. Furthermore, it counts time TM0, TM1, . . . for delay of the braking action after the turn on of the brake switch SW-B. Also, it counts time for the regenerative brake mode period II–II′ and for the constant speed control period III–IV as effected in steps #16 to #19. For counting time other than the constant speed control period III–IV, that is for counting the time for the scans A and B, the delay of braking action, and the regenerative brake mode period, the counting is carried out in such a manner that the counter is loaded with a complement of the required period. When the counter counts up to its maximum an overflow signal is produced thereby indicating that the required period is counted.

As mentioned above, interrupt routines INT-F and INT-T take place repeatedly after step #34. Now, interrupt routine INT-F under provisional scan A is carried out in the following manner. Referring again to FIG. 8, pulse spacing FG1 is calculated in step #F-1. In next step #F-2, the difference dFG=FG1−FG0 is calculated. Then, in step #F-3, it is determined whether there is a request for the TON correction. Since there is a request as introduced in step 37#, the program advances to step #F-4, wherein it is determined whether the difference dFG is greater than zero. If it is greater than zero, it is understood that the scanning speed is slower than the required speed. Accordingly, the program advances to step #F-5 wherein time TON is added with 1 to increase the power supplying time. If dFG smaller than zero, the scanning speed is faster than the required speed. Accordingly, the program advances to step #F-6 wherein time TON is subtracted by 1 to reduce the power supplying time. Therefore, in steps #F-4 to #F-6, the power supplying time TON is corrected for the first time. Thereafter, in steps #F-7 to #F-11, particularly in step #F-10, power supplying time TON is corrected for the second time, in the manner described above. Thus, in interrupt routine INT-F of subroutine SCAN A, register MTON is stored with a twice-corrected power supplying time TON, and motor M1 is controlled with the use of such a twice-corrected power supplying time TON.

Referring again to FIG. 12, in step #38, it is determined whether the counter has counted the amount of time for the provisional scan A or not. Needless to say that during the counting, interrupt routines INT-F and INT-T are carried out repeatedly to maintain the scanning speed constant at the required speed Vscan. When the counter has completed counting, i.e., when the scanning apparatus has scanned all the way to the point I of the provisional scan A, as indicated in FIG. 4, the program advances from step #38 to #39. Accordingly, subroutine MCOFF is carried out to prohibit any interrupt routines (step #23) and to turn switching circuit 7 temporarily to reverse non-drive mode (step #24). Then, in step #40, the corrected power supplying time TON as obtained at the final round of interrupt routine INT-F, i.e., as obtained before step #39, is stored in register TON for controlling the motor speed in the subsequent subroutine SCAN B up to a moment when the exposure switch SW-E turns on.

Next, subroutine RETURN is carried out for the control of the scanning apparatus from the point I to the home position.

Figure 14:
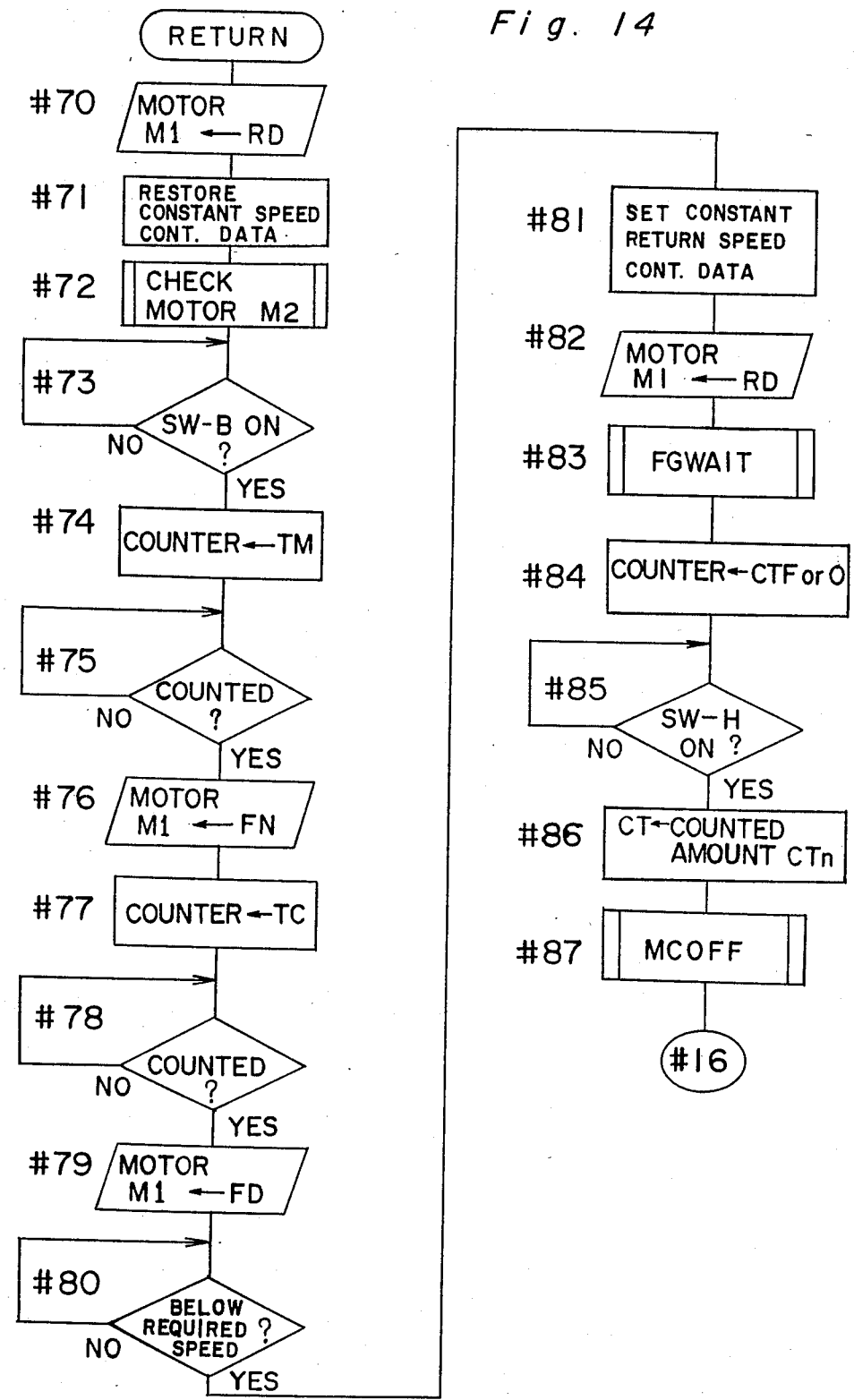
FIG. 14 shows a subroutine for carrying out a return movement.

Refering to FIG. 14, subroutine RETURN starts from step #70 in which switching circuit 7 is turned to the reverse drive mode (RD) for driving motor M1 in the reverse direction with a constant applied power. Then, in step #71, the constant speed control data, such as FG0 and A, are restored. In step #72, a subroutine CHECK MOTOR M2 is carried out so as to keep motor M2 in a well balanced speed with respect to the speed of motor M1, and also to determine whether there is anything malfunction in motor M2 or not. The details of subroutine CHECK MOTOR M2 will be described later in connection with FIG. 15. If motor M2 is running normally without malfunction, the program advances to step #73 wherein it is determined whether brake switch SW-B is on. When brake switch SW-B turns on, the program advances from step #73 to step #74 to count the delay period stored in register TM by the counter. It is to be noted that in the previous subroutine SCAN A, step #31, the delay period TM0 is set up in register TM. Thus, in the step #75, it is determined whether the counter has counted delay period TM0. When the counter has counted delay period TM0, i.e., at the moment II as indicated in FIG. 4, the program advances to step #76. At step #76, switching circuit 7 is changed to the forward non-drive mode (FN). At step #76, since motor M1 is running in the reverse direction, the forward non-drive mode (FN) of switching circuit 7 provides regenerative braking force to motor M1, with such regenerative braking continuing until the counter counts a predetermined fixed time TC, as carried out in steps #77 and #78, thereby gradually reducing the scanning speed, as shown in FIG. 4 between points II and II'. Then, in step #79, switching circuit 7 is changed to the forward driving mode (FD), so as to brake the scanning apparatus with a greater braking force, referred to as the coercive braking force. Such a coercive braking continues until the return speed is reduced to a required speed, as detected in step #80. Then, in step #81, constant return speed control speed data, such as, data FG0, TON and A as stored in memory ROM, are read out and shifted to registers in memory RAM. Then, in step #82, switching circuit 7 is changed to the reverse drive mode (RD) and, in step #82, subroutine FGWAIT is carried out to permit interrupt routines INT-T and INT-F, thereby carrying out the constant-speed control. Then, from the start of constant speed control, the counter starts to count time, as effected in step #84.

It is to be noted that in subroutine RETURN after subroutine SCAN B, which will be described later, the counter (step #84) counts up from zero. But, in subroutine RETURN after subroutine SCAN A, as in the present case, the counter (step #84) counts up from a correction factor CTF, which has been calculated and stored in register CT in the step #33. The counting is effected by counting encoder pulses to obtain distance information, and is carried out until home switch SW-H turns on. In other words, during steps #84 and #85, the counter counts a distance of movement of the scanning arrangement under the constant speed control, i.e., between points III and IV shown in FIG. 4. When home switch SW-H turns on, the counter stops counting, thereby holding a counted amount CT0. It is to be noted that counted amount CT0 is already added with correction factor CTF. Then, in step #86, the data carried in register CT is changed from the amount CTF to the counted amount CT0 and, thereafter, in step #87, a subroutine MCOFF is carried out to prohibit any interrupt routines (step #23) and to turn switching circuit 7 temporarily to the reverse non-drive mode (step #24). Then, the program advances to step #16, shown in FIG. 9, to gently return the scanning apparatus to the home position.

Returning to FIG. 6, after subroutines SCAN A (step #5) and RETURN (step #6), and if the scan signal is still present, subroutines SCAN B and RETURN are carried out. Next, subroutines SCAN B and RETURN are described.

Figure 13:
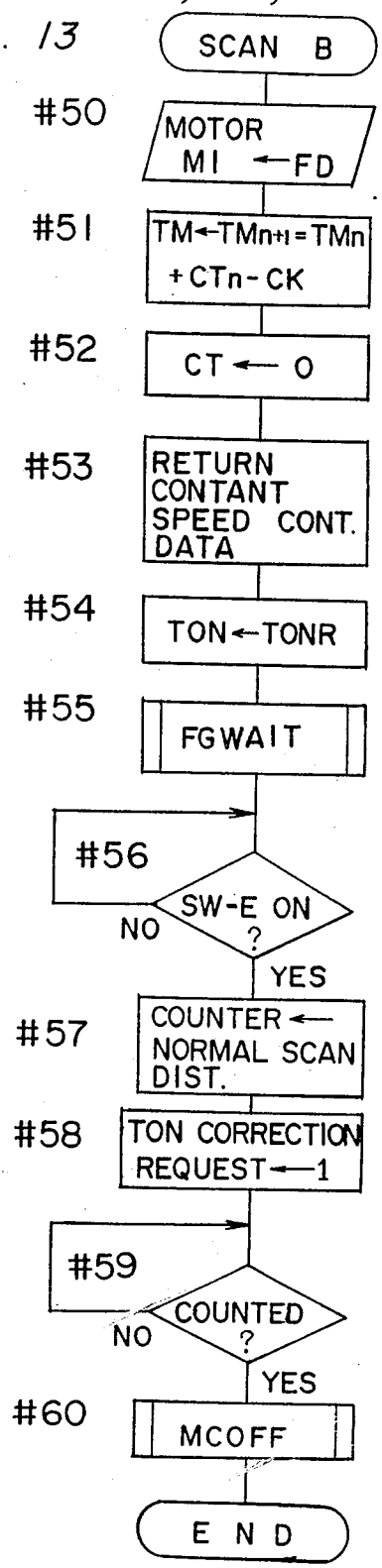
FIG. 13 shows a subroutine for carrying out a scan B.

Referring to FIG. 13, subroutine SCAN B starts from step #50 wherein switching circuit 7 is turned to the forward drive mode (FD). Thus, the scanning apparatus starts to move forward from the home position, and is accelerated with full power at least until the first encoder pulse occurs. Also, drive-on and drive-off data are stored in the same manner as in the subroutine SCAN A. Then, in step #51, register TM is replaced with a new data TMn+1 calculated through a formula:

TMn+1=TMn+CTn−CK wherein TMn is data previously stored in register TM as obtained in the previous subroutine SCAN A, step #31, or SCAN B, step #51 (Under the present stage, TMn is equal to TM0 as stored in step #31 shown in FIG. 12.). CTn is a data stored in register CT as obtained in the previous subroutine RETURN, step #86 (Under the present stage, CTn is equal to CT0), and CK is a constant. Thus, at the present stage, a new data TM1=TM0+CT0−CK is stored in the register TM.

It is to be noted that the above given formula effects such a way to bring CTn equal to CK. In other words, when CTn is smaller than CK, it is understood that the brake mode starts rather late. Therefore, in this case, the delay time TMn+1 for the next round is corrected to have an amount smaller than TMn. Conversely, when CTn is greater than Ck, it is understood that the brake mode starts rather early. Therefore, in this case, delay time TMn+1 is corrected to have an amount greater than TMn. In either case, the delay time TMn+1 for the next round becomes closer to a certain amount TMc, which is obtained when CTn becomes equal to CK.

Then, in step #52, register CT is cleared. In step #53, the constant speed control data, such as FG0 and A, are returned, and in step #54, the corrected power supplying time TON stored in the register TONR in the previous step #40 (FIG. 12) is returned.

Next, in step #55, subroutine FGWAIT is effected to permit interrupt routines INT-T and INT-F, so that the constant speed control starts. Then, in step #56, it is determined whether exposure switch SW-E is on. When exposure switch SW-E turns on, the program advances from step #56 to #57. In step #57, the counter is set with an amount of time for normal scan B, and in step #58, a "1" indicating the request for the TON correction is set up. Then, in step #59, it is determined whether the counter has counted the amount of time for the normal scan B. Needless to say that during the counting, interrupt routines INT-F and INT-T are carried out repeatedly to maintain the scanning speed at the required speed Vscan. When the counter has completed counting, i.e., when the scanning apparatus has scanned all way to point I of the normal scan B, the program advances from step #59 to #60. Accordingly, subroutine MCOFF is carried out to prohibit any interrupt routines (step #23) and to turn switching circuit 7 temporarily to the reverse non-drive mode (step #24).

Next, subroutine RETURN for the normal scan B is carried out. Subroutine RETURN for normal scan B uses the same subroutine for provisional scan A, but there are a few changes in the parameters, as described below.

Referring again to FIG. 14, subroutine RETURN for the normal scan B is carried out by running the scanning apparatus in a reverse direction at a full acceleration (step #70) until the counter, which starts counting from the moment when brake switch SW-B turns on, counts up to the content stored in register TM (step #75). According to the subroutine RETURN for the normal scan B, register TM is holding a new data TM1=TM0+CT0−CK. Therefore, the brake mode starts (step #76) after the delay time TM1 from the turn on of brake switch SW-B, as indicated in FIG. 4. Under the brake mode, first the regenerative braking (FN) takes place for a predetermined fixed time (steps #77 and #78), and then the coercive braking (FD) takes places until the speed is reduced to a predetermined low speed (steps #79 and #80). Thereafter, the scanning apparatus moves (step #83) towards the home position at said predetermined low speed until the home switch turns on. During the movement of the scanning apparatus at said predetermined low speed, the counter counts the encoder pulses so as to measure the distance which the scanning apparatus has moved at said predetermined low speed, and the counted amount CTn is stored in register CT as a new data (steps #84, #85 and #86). Thereafter, subroutine MCOFF is carried out (step #87) to stop the constant speed control. Then, the program advances to steps #16, shown in FIG. 9, to gently return the scanning apparatus to the home position.

It is to be noted that, under subroutine RETURN for normal scan B, the counter in step #84 counts up from zero.

It is also to be noted that the delay time data TM1, containing the time information CT0 is such that the distance of constant speed return, i.e., between the points III and IV is reduced.

Figure 15:
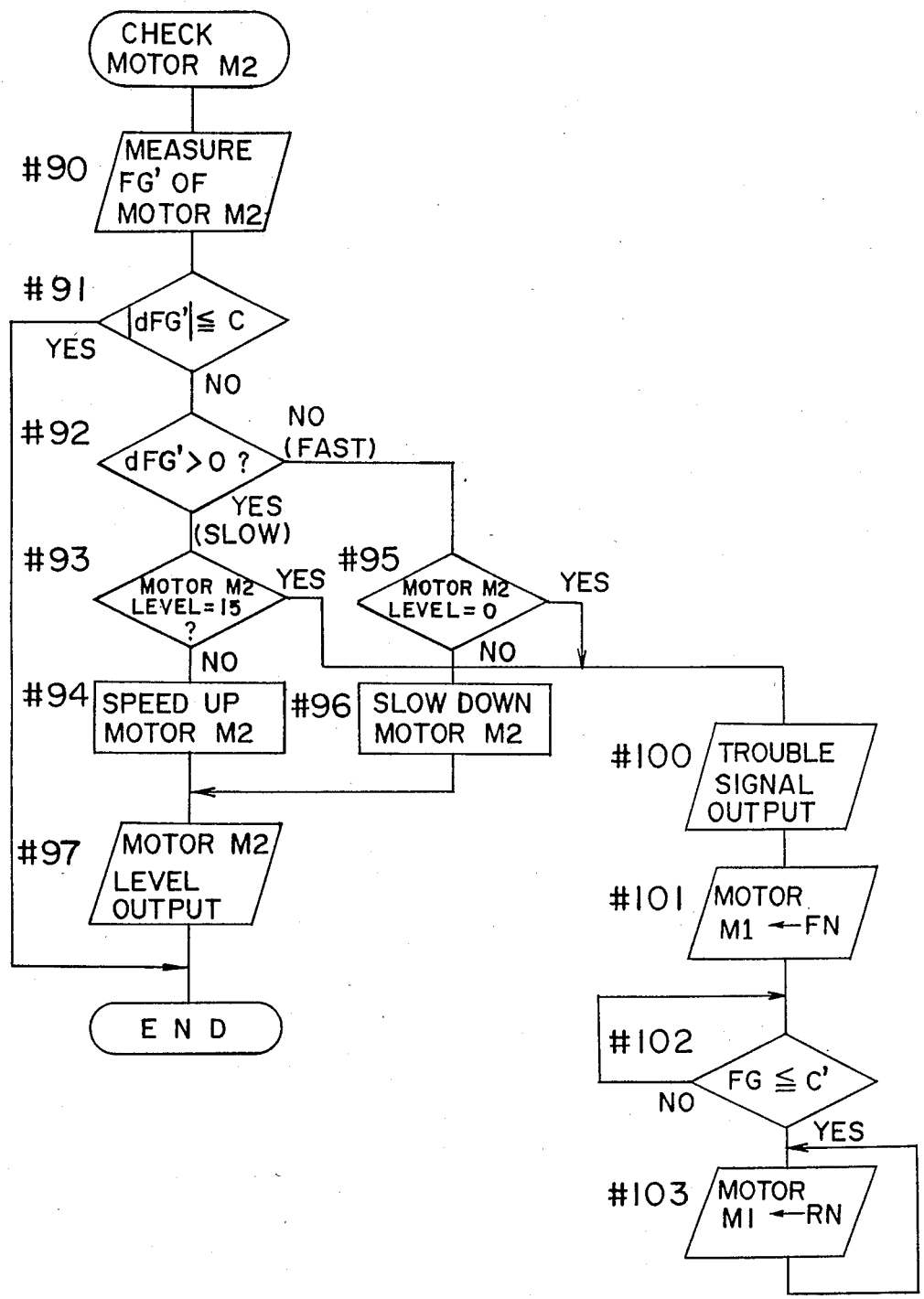
FIG. 15 is a flow chart showing steps to control motor M2.

Referring to FIG. 15, subroutine CHECK MOTOR M2 starts from step #90 in which the pulse spacing FG' of the pulses produced from the encoder 3' is measured. Thus, in step #90, speed of the motor M2 is measured. Then, in step #91, a difference dFG':

dFG'=FG'−FG0' is calculated, wherein FG0' is a reference pulse spacing. Also in step #91, it is determined whether the absolute value of difference dFG' is within a tolerance. If it is within tolerance C, it is understood that motor M2 is running at the proper speed. Thus, in this case, subroutine CHECK MOTOR M2 ends immediately. Conversely, if the magnitude of difference dFG' is greater than tolerance C, the program advances to step #92 in which the polarity of difference dFG' is determined.

If difference dFG' is negative motor M2 is running at a speed much faster than the required speed. The program will then advance to step #95 at which time it is determined whether the power applied to the motor M2 is at the minimum level 0. If it is at the minimum level, the program advances to step #100 for producing an alarm signal and, at the same time, switching circuit 7 is turned to the forward non-driving mode (step #101) to provide regenerative braking to motor M1. Then, when motor M1 slows down below a predetermined speed (step #102), switching circuit 7 turns to reverse non-driving mode (step #103) to stop motor M1. In step #95, if the power applied to motor M2 is not at the minimum level, the power is reduced in step #96 to slow down motor M2, and in step #97 motor M2 is supplied with a reduced power.

If it is determined that difference dFG' is greater than zero in step #92, motor M2 is running at a speed much slower than the required speed. The program will then advance to step #93 at which time it is determined whether the power applied to motor M2 is at a maximum level 15 or not. If at the maximum level, the program will advance to step #100 to produce an alarm signal and stop motor M1 in the above described manner. In step #93, if the power applied to motor M2 is not at maximum level 15, the power is increased in step #94 to speed up motor M2, and in step #97 the motor is supplied with an increased power.

When subroutine scan B and subroutine RETURN of the first cycle ends in the above described manner, similar subroutines scan B and RETURN are carried out repeatedly so long as the scan signal is present. As the number of cycles increases, the constant slow speed returning distance, i.e., between points III and IV becomes short, thereby reducing the time necessary to carry out one reciprocation of the scanning apparatus. Thus, the control system according to the present invention controls the scanning apparatus to reciprocate in a very short period of time with a simple structure, and yet maintains a high accuracy in positioning the scanning apparatus to a predetermined position, such as a home position.

Although the present invention has been fully described with reference to a preferred embodiment, many modifications and variations thereof will now be apparent to those skilled in the art. The scope of the present invention is therefore to be limited not by the details of the preferred embodiment described above, but only by the terms of the appended claims.

What is claimed is:

1. A system for controlling the reciprocation of a scanning apparatus comprising:

scanning means for scanning an original, said scanning means adapted to scan from a home position across said original to a scanned position and to return from the scanned position back to the home position;

a D.C. motor for diving said scanning means;

braking means for providing a braking action to said D.C. motor;

a switching circuit for providing electric power to said D.C. motor;

home position detecting means for detecting when said scanning means is in said home position;

measure means for measuring a distance of movement of said scanning means;

speed detecting means for detecting the speed of said scanning means;

control means coupled to said switching circuit for controlling the movement of the scanning means such that: said scanning means scans across said original at a predetermined constant speed; when said scanning means reaches said scanned position, it starts to return back toward said home position by application of a constant supply of power having a predetermined level; when said scanning means is returned to a preselected position, said braking means provide a braking action which lasts until the returning speed is reduced to a predetermined low speed as detected by said speed detecting means; said scanning means is returned at said low constant speed until said home position detecting means detects that said scanning means is in said home position; said measure means measures the distance of movement of said scanning means at said low constant speed; said scanning means is stopped at said home position; and said distance is used for calculating a preselected position for the next cycle of scan so that said distance in the next cycle of scan is controlled to be substantially equal to a predetermined distance.

2. A system as claimed in claim 1, wherein said control means further controls the movement of the scanning means such that a provisional scan and return movement is carried out before scanning said original so as to obtain information of an initial distance.

3. A system as claimed in claim 1, further comprising a pulse generating means coupled to said D.C. motor for producing a train of pulses relative to the speed of said D.C. motor.

4. A system as claimed in claim 3, wherein said measure means comprises a counter for counting the number of said pulses to obtain a distance of movement of said scanning means.

5. A system as claimed in claim 3, wherein said speed detecting means detects the speed of said scanning means by counting the number of said pulses in a unit time.

6. A system for controlling the reciprocation of a scanning apparatus comprising:
scanning means for scanning an original, said scanning means adapted to scan from a home position across said original to a scanned position and returning it from the scanned position back to the home position;
a D.C. motor for driving said scanning means;
a switching circuit for providing electric power to said D.C. motor;
home position detecting means for detecting when said scanning means is in said home position;
intermediate position detecting means for detecting when said scanning means moves past a predetermined intermediate position;
measure means for measuring a distance of movement of said scanning means;
speed detecting means for detecting the speed of said scanning means;
control means adapted to said switching circuit for controlling the movement of the scanning means such that: said scanning means scans across said original at a predetermined constant speed; when said scanning means reaches said scanned position, it starts to return back towards said home position with application of a constant supply of power having a predetermined level; when said scanning means is returned back to said predetermined intermediate position as detected by said intermediate position detecting means, said masure means starts to measure a distance of movement of said scanning means; when said measure means measures a preselected distance TM said scanning means is braked until the returning speed is reduced to a predetermined low speed as detected by said speed detecting means; said scanning means is returned at said low constant speed until said home position detecting means detects that said scanning means is in said home position; said measure means measures the distance CT of movement of said scanning means moved at said low constant speed; said scanning means is stopped at said home position; and said distance CT is used for calculating a distance TM for the next cycle of scan so that the distance CT in the next cycle of scan is controlled to be substantially equal to a predetermined distance.

7. A system as claimed in claim 6, wherein said control means further controls the movement of the scanning means such that a provisional scan and return movement is carried out before scanning said original so as to obtain information of initial distance CT.

8. A system as claimed in claim 6, further comprising a pulse generating means coupled to said D.C. motor for producing a train of pulses relative to the speed of said D.C. motor.

9. A system as claimed in claim 8, wherein said measure means comprises a counter for counting the number of said pulses to obtain a distance of movement of said scanning means.

10. A system as claimed in claim 8, wherein said speed detecting means detects the speed of said scanning means by counting the number of said pulses in a unit time.

11. A system for controlling the reciprocation of a scanning apparatus for a copying machine comprising:
scanning means for scanning an original document, said scanning means adapted to scan from a home position across said original document to a scanned position and back to said home position at a variable speed;
drive means for driving said scanning means;
intermediate detecting means for detecting when said scanning means is at a position intermediate said home position and said scanned position;
braking means for providing braking action to said scanning means;
measurement means for measuring movement of said scanning means;
data storage means responsive to said measurement means for storing data which corresponds to measured movement of said scanning means from said scanned position back to said home position;
control means connected to the data storage means and responsive to said intermediate detecting means for controlling said braking means such that braking action is applied to said scanning means during a high speed return cycle subsequent to the passage of said scanning means past said intermediate position towards said home position, said control means is also responsive to said measurement means measurement of the subsequent constant speed movement of the scanning means after the braking means has reduced the hih speed return movement to a low constant speed, to provide subsequent adjustment to the time of applying a braking action in a subsequent return movement whereby the low speed movement is maintained over a substantially constant predetermined distance to minimize the return time in a copying cycle.

12. The system of claim 11 wherein said measurement means includes measure means for measuring distance of movement of said scanning means.

13. The system of claim 12 wherein said measurement means includes speed detecting means for detecting the speed of said scanning means.

14. The system of claim 13 wherein said drive means includes a D.C. motor.

15. The system of claim 14 wherein said braking means includes switching circuit means for controlling application of electric power to said D.C. motor.

16. The system of claim 15 wherein said measurement means includes pulse generating means for generating a train of pulses having a frequencying which corresponds to the speed of movement of said scanning means.

17. The system of claim 16 wherein said measure means includes a counter for counting the number of said pulses in order to determine said distance of movement of said scanning apparatus.

18. The system of claim 17 wherein said speed detecting means detects the speed of said scanning means by counting the number of said pulses in a unit time.

* * * * *